(12) United States Patent
Kim

(10) Patent No.: US 9,625,996 B2
(45) Date of Patent: Apr. 18, 2017

(54) ELECTRONIC DEVICE AND CONTROL METHOD THEREOF

(71) Applicant: LG ELECTRONICS INC., Seoul (KR)

(72) Inventor: Seho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 126 days.

(21) Appl. No.: 14/280,224

(22) Filed: May 16, 2014

(65) Prior Publication Data

US 2014/0354536 A1 Dec. 4, 2014

(30) Foreign Application Priority Data

May 31, 2013 (KR) .................. 10-2013-0062432

(51) Int. Cl.
*G09G 5/00* (2006.01)
*G06F 3/02* (2006.01)
*G06F 3/041* (2006.01)
*G06F 3/045* (2006.01)
*G06F 3/01* (2006.01)
*H04N 5/74* (2006.01)
*G06F 3/042* (2006.01)
*G06F 3/0488* (2013.01)

(52) U.S. Cl.
CPC ............ *G06F 3/017* (2013.01); *G06F 3/0425* (2013.01); *G06F 3/0426* (2013.01); *G06F 3/04883* (2013.01); *G06F 3/04886* (2013.01); *H04N 5/7408* (2013.01)

(58) Field of Classification Search
CPC .......... G06F 3/017; G06F 3/011; G06F 3/0425
See application file for complete search history.

(56) References Cited

U.S. PATENT DOCUMENTS

| | | | |
|---|---|---|---|
| 2008/0018591 A1 | 1/2008 | Pittel et al. | |
| 2010/0093399 A1* | 4/2010 | Kim .................... | H04M 1/0202 455/566 |
| 2010/0177035 A1* | 7/2010 | Schowengerdt et al. ..... | 345/156 |

(Continued)

FOREIGN PATENT DOCUMENTS

| | | |
|---|---|---|
| CN | 101901051 A | 12/2010 |
| CN | 102375614 A | 3/2012 |
| GB | 2470653 A | 12/2010 |

*Primary Examiner* — Alexander Eisen
*Assistant Examiner* — Nan-Ying Yang
(74) *Attorney, Agent, or Firm* — Birch, Stewart, Kolasch & Birch, LLP

(57) ABSTRACT

An electronic device including a projection module and a control method thereof are disclosed. The electronic device includes: a display module; a camera configured to capture a user gesture; the projection module configured to project a virtual control object on a plane within a predetermined distance from the electronic device; and a controller configured to display on the display module a screen associated with operations running on the electronic device, and upon receiving a predetermined user gesture through the camera, project a virtual control object on the plane through the projection module to control at least one of the operations running on the electronic device at the time when the user gesture is received. Accordingly, a virtual control object for controlling an operation running on the electronic device can be projected on a plane.

19 Claims, 22 Drawing Sheets

(56) References Cited

U.S. PATENT DOCUMENTS

| | | | |
|---|---|---|---|
| 2010/0199232 A1* | 8/2010 | Mistry et al. | 715/863 |
| 2011/0154249 A1* | 6/2011 | Jang | G06F 3/017 715/781 |
| 2012/0038592 A1 | 2/2012 | Shyu et al. | |
| 2012/0249409 A1* | 10/2012 | Toney | G06F 3/017 345/156 |
| 2013/0181905 A1* | 7/2013 | Chiang | 345/168 |
| 2013/0285933 A1* | 10/2013 | Sim et al. | 345/173 |
| 2014/0015757 A1 | 1/2014 | Li | |

* cited by examiner (a) (b) (c)

FIG. 5
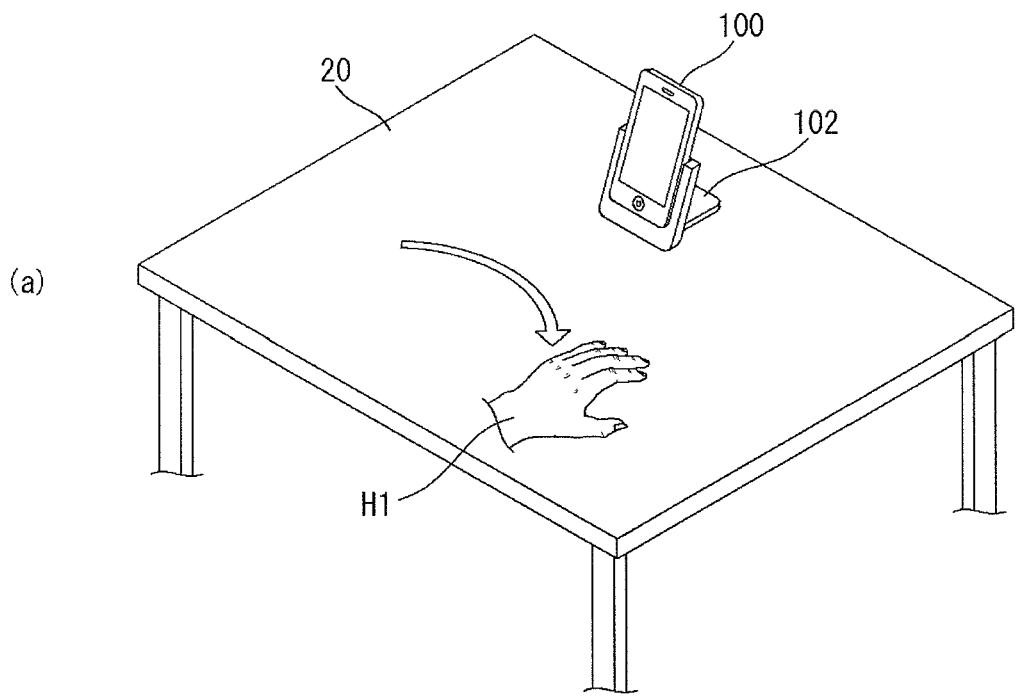
(a)
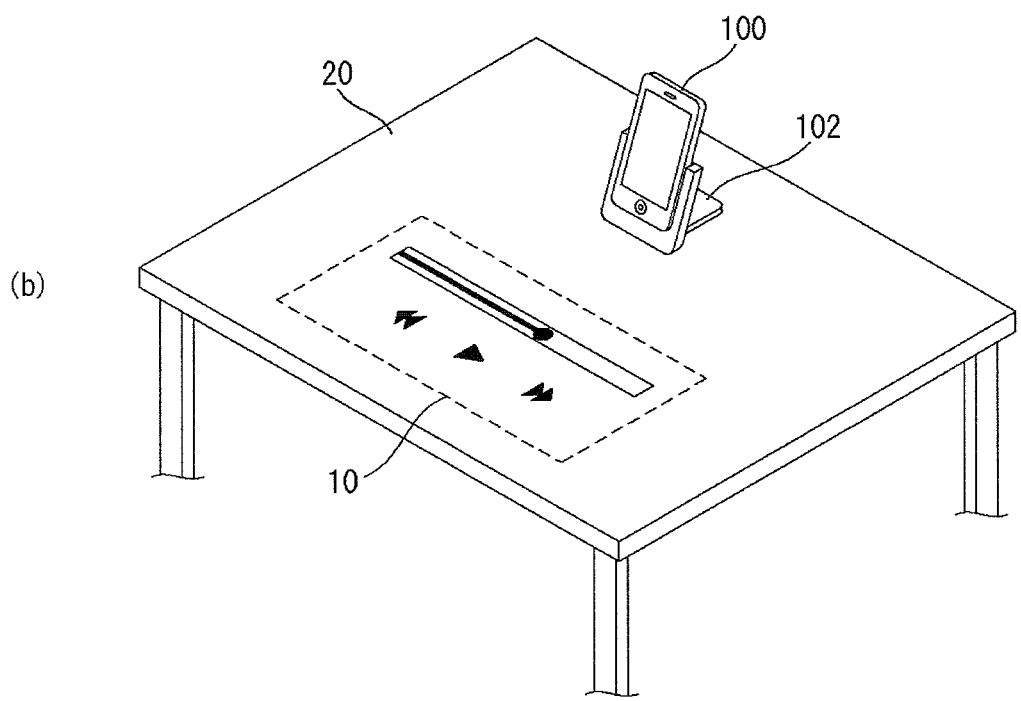
(b)

FIG. 7
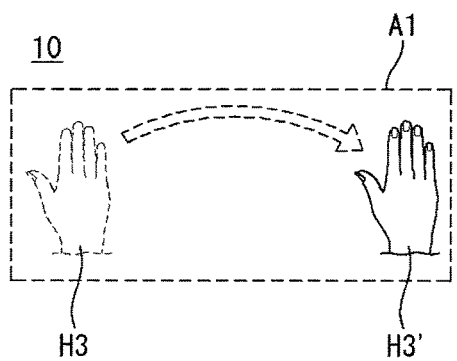
(a)
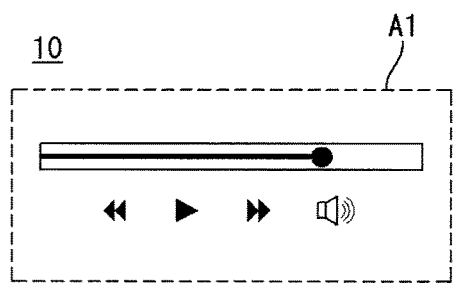
(b)
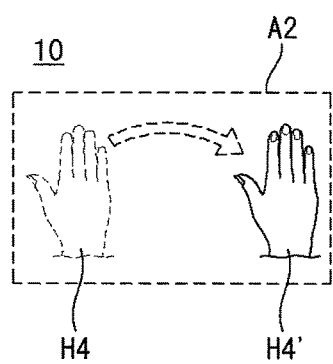
(c)
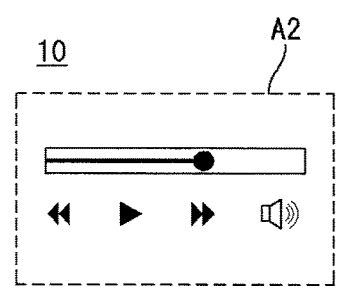
(d)

FIG. 8
(a) 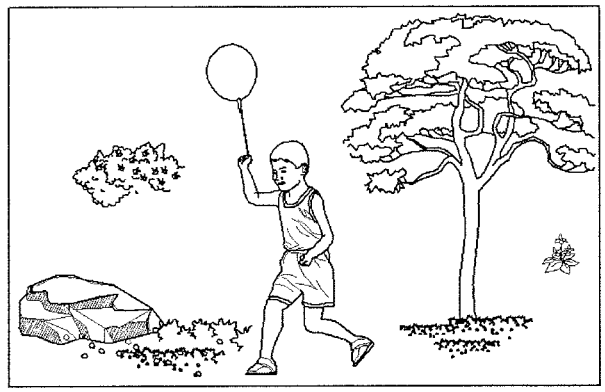
(b) 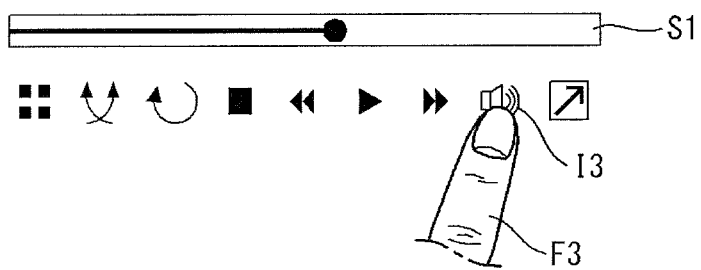
(c) 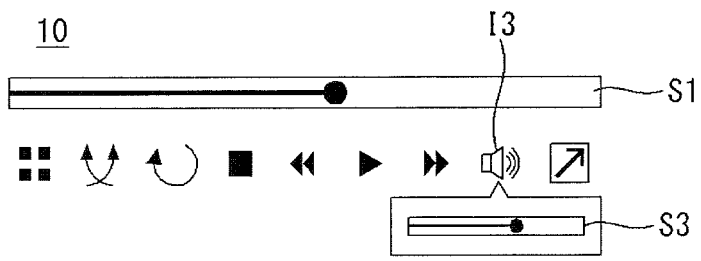

Wearing a blue prison jumpsuit, O.J. Simpson arrived at a Las Vegas courthouse today looking heavier and grayer than the handsome sports hero who once dominated the football field and became an avid golfer in his retirement.

Simpson, 65, was in court today to request a new trial on the (a)

151 grounds that his former attorney mishandled the armed robbery-kidnapping case that landed him a nine-to-33 year prison sentence.

The former National Football League star smiled and joked with his legal team as an officer shackled his hands during the lunch recess.

(c)

10

  —S5

| list | scrap | search | setting |

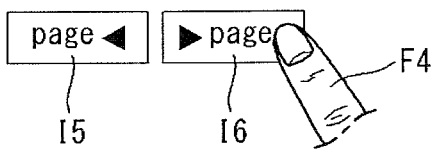

page ◀    ▶ page   —F4
  |         |
  I5        I6

(b)

FIG. 11
(a)
(b)
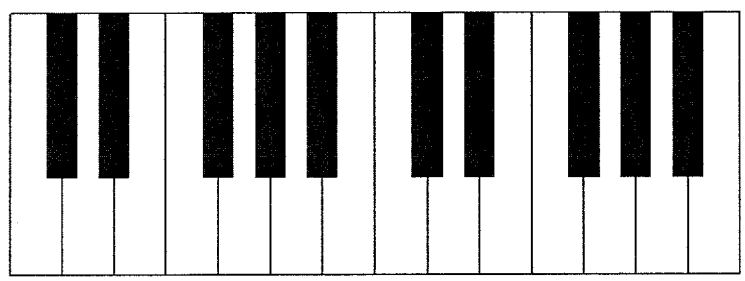

FIG. 13
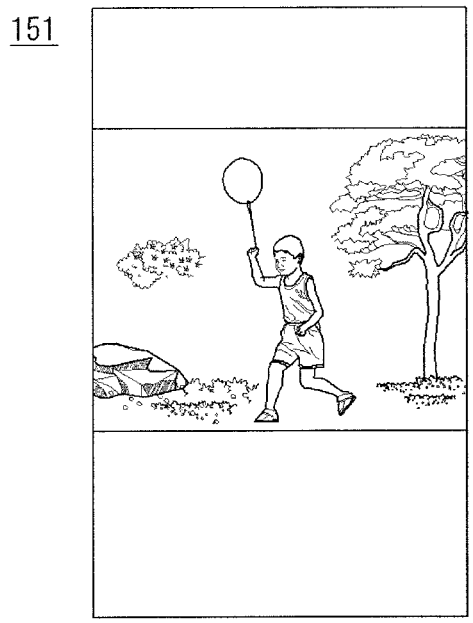
(a)
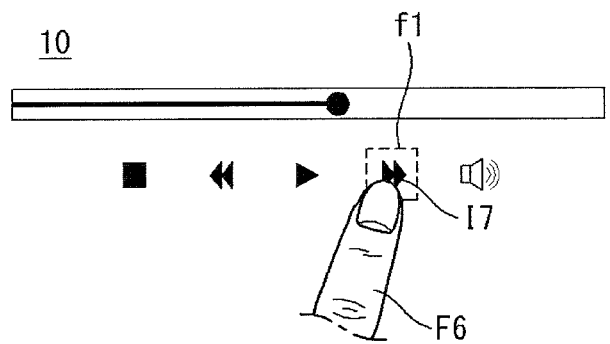
(b)

FIG. 16
(a) 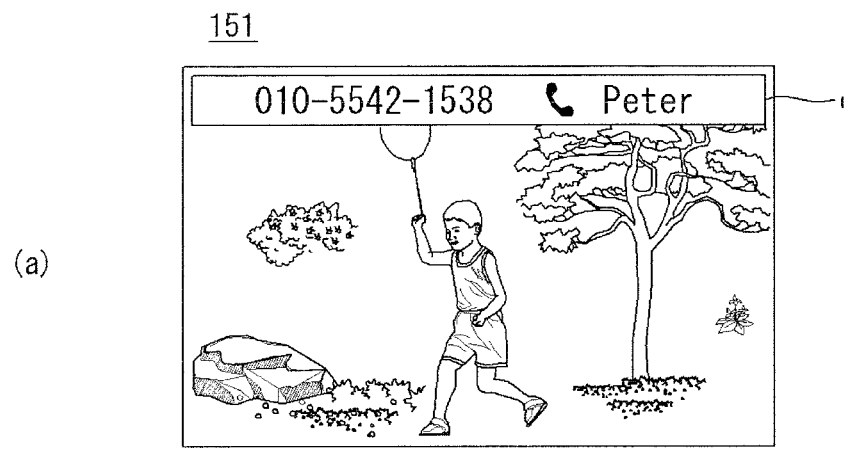
(b) 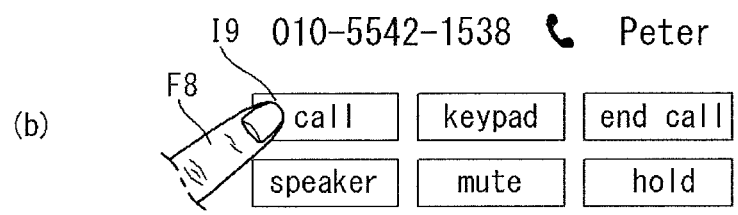
(c) 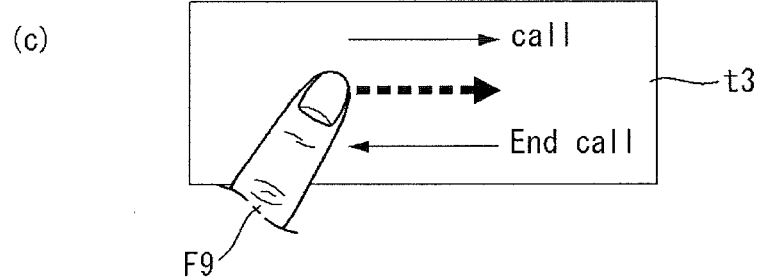

FIG. 17
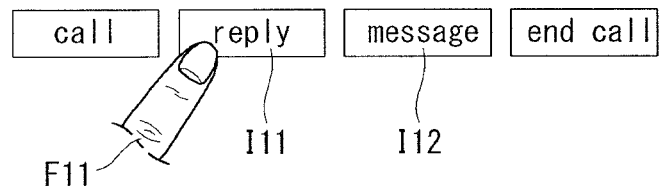
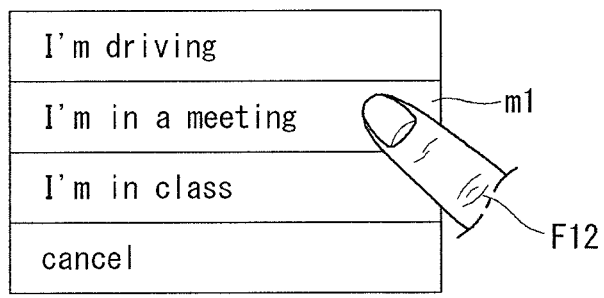

FIG. 19
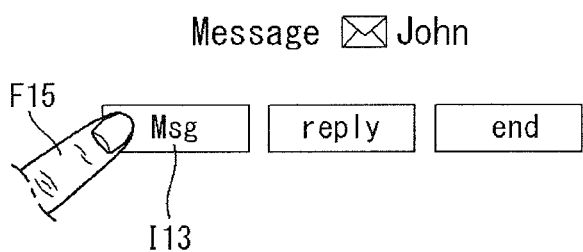

FIG. 22
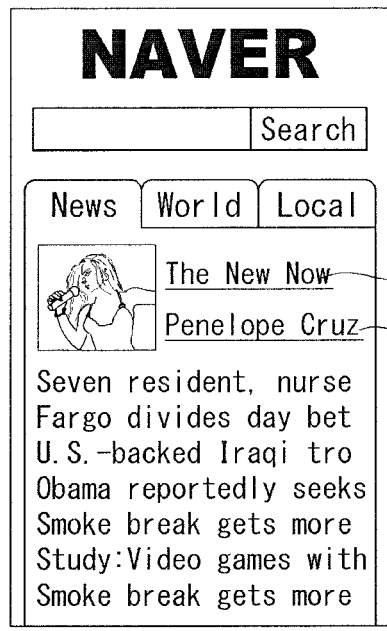
(a)
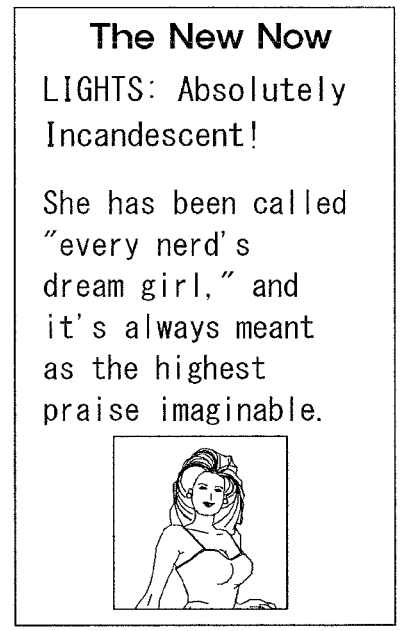
(c)
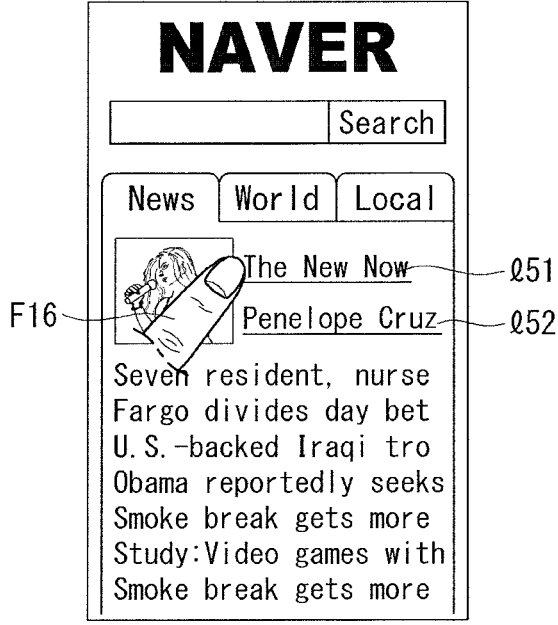
(b)

ELECTRONIC DEVICE AND CONTROL METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2013-0062432, filed on 31 May 2013, the contents of which are incorporated by reference herein in their entirety.

TECHNICAL FIELD

The present invention relates to an electronic device and a control method thereof, and more particularly, to projecting a virtual control object on a plane to control operations running on an electronic device.

DISCUSSION OF THE RELATED ART

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions. To support and enhance the increasing number of functions in a terminal, improving a structural part and/or a software part of the terminal would be desirable.

As various terminals including a mobile terminal provide a variety of complicated functions, menu structures also become complicated. Furthermore, a function of displaying digital documents including web pages through a terminal is added.

SUMMARY

An object of the present invention is to provide an electronic device which is capable of projecting a virtual control object on a plane to control operations running on it, and a control method thereof. It is to be understood that technical objects to be achieved by the present invention are not limited to the aforementioned technical object and other technical objects which are not mentioned herein will be apparent from the following description to one of ordinary skill in the art to which the present invention pertains.

To accomplish the above object, an embodiment of the present invention provides an electronic device including a projection module, the electronic device including: a display module; a camera configured to capture a user gesture; the projection module configured to project a virtual control object on a plane within a predetermined distance from the electronic device; and a controller configured to display on the display module a screen associated with operations running on the electronic device, and upon receiving a predetermined user gesture through the camera, project a virtual control object on the plane through the projection module to control at least one of the operations running on the electronic device at the time when the user gesture is received.

An operation running on the electronic device may be a predetermined application that is running on the electronic device.

An operation running on the electronic device may be an event that has occurred on the electronic device.

The event may include at least either call reception, message reception, or alarm.

The controller may receive the predetermined user gesture from the plane within the predetermined distance from the electronic device.

The controller may project the virtual control object in a region of the plane that corresponds to the gesture reception range.

The virtual control object may include at least either an icon, a scrollbar, a touch input reception area, or a keypad to control the operation running on the electronic device.

The controller may receive an input for controlling the running operation by a touch input on the virtual control object.

Upon receiving a touch input for selecting an area of the virtual control object, the controller may project the selected area on the plane to distinguish the selected area from other areas.

The controller may further display on the display module an object including the same image as the virtual control object projected on the plane.

Upon receiving a touch input for selecting an area of the virtual control object, the controller may display an indicator on the display module to indicate that the touch input has been received.

The virtual control object may include the same image as the screen displayed on the display module.

To accomplish the above object, another embodiment of the present invention provides a control method of an electronic device including a projection module, the control method including: displaying on a display module a screen associated with operations running on the electronic device; receiving a predetermined user gesture through a camera; and projecting a virtual control object on a plane within a predetermined distance from the electronic device through the projection module to control at least one of the operations running on the electronic device at the time when the user gesture is received.

In the receiving of a user gesture, the predetermined user gesture may be received from the plane within the predetermined distance from the electronic device.

In the projecting of a virtual control object on a plane, the virtual control object may be projected in a region of the plane that corresponds to the gesture reception range.

The control method of the electronic device may further include receiving an input for controlling the running operation by a touch input on the virtual control object.

The control method of the electronic device may further include, upon receiving a touch input for selecting an area of the virtual control object, projecting the selected area on the plane to distinguish the selected area from other areas.

The control method of the electronic device may further include displaying on the display module an object including the same image as the virtual control object projected on the plane.

The control method of the electronic device may further include, upon receiving a touch input for selecting an area of the virtual control object, displaying an indicator on the display module to indicate that the touch input has been received.

The electronic device and the control method thereof according to the present invention have the following advantages.

According to the present invention, a control object associated with a currently running operation, that is, a virtual control object suitable for each situation, can be projected on a plane.

Furthermore, the currently running operation can be controlled by touching the virtual control object projected on the plane, without the user's manipulating the electronic device.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIGS. 5 to 7 are views for explaining an embodiment of the present invention.

FIGS. 8 to 11 illustrate an example where a virtual control object associated with a running application is displayed according to an embodiment of the present invention.

FIGS. 12 to 15 are sequential charts and views for explaining an example of feedback for an input signal according to an embodiment of the present invention.

FIGS. 16 to 20 illustrate an example where a virtual control object associated with event occurrence according to an embodiment of the present invention.

FIG. 22 is a view for explaining another embodiment of the present invention.

DETAILED DESCRIPTION

Figure 1:
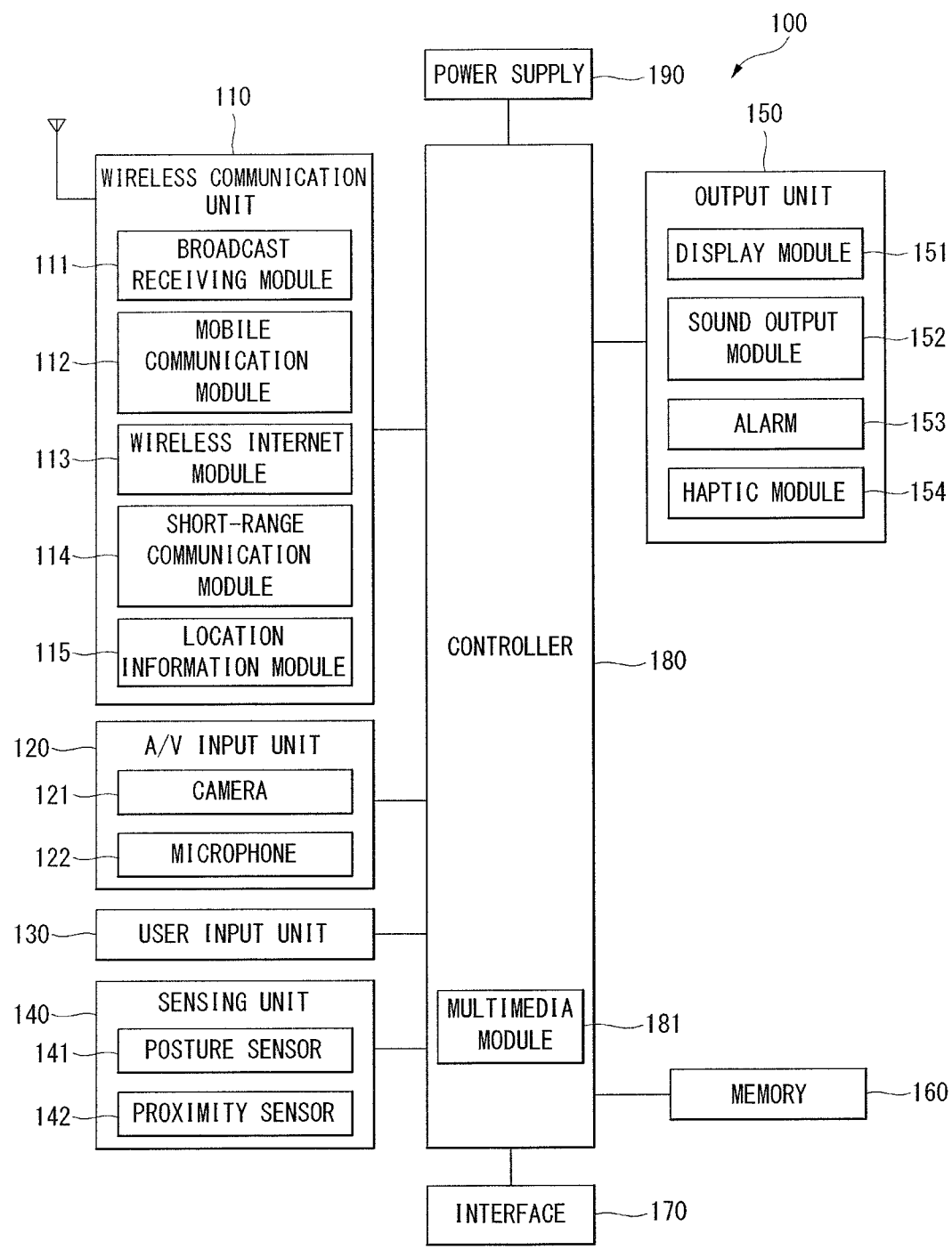
FIG. 1 is a block diagram of an electronic device according to an embodiment of the present invention.

The above and other aspects, features and advantages of the present disclosure will be more apparent from the following detailed description taken in conjunction with the accompanying drawings. As the invention allows for various changes and numerous embodiments, a particular embodiment will be illustrated in the drawings and described in detail in the written description. Like reference numerals refer to like elements throughout the specification. In describing the present disclosure, detailed descriptions of well-known functions or configurations will be omitted in order to not necessarily obscure the subject matter of the present disclosure. Numerals (e.g., first, second, etc.) used in the description of the present invention are only for distinguishing one element from another element.

An electronic device according to the present invention may be described below with reference to the accompanying drawings. In the following description, suffixes "module" and "unit" may be given to components of the electronic device in consideration of only facilitation of description and do not have meanings or functions discriminated from each other.

The electronic device may include a cellular phone, a smart phone, a laptop computer, a digital broadcasting terminal, personal digital assistants (PDA), a portable multimedia player (PMP), a navigation system and/or so on. It should be apparent to those skilled in the art that a configuration according to an embodiment disclosed in this specification should be applicable to fixed or stationary terminals, such as a digital TV or a desktop computer, except for applications disclosed to be specific only to a mobile terminal.

FIG. 1 is a block diagram of an electronic device according to an embodiment of the present invention.

The electronic device 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 are not essential parts and the number of components included in the electronic device 100 can be varied. Components of the electronic device 100 may now be described.

The wireless communication unit 110 may include at least one module that enables radio communication between the electronic device 100 and a radio communication system or between the electronic device 100 and a network in which the electronic device 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel.

The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal. The broadcasting signals may include not only TV broadcasting signals, radio broadcasting signals, and data broadcasting signals but also signals in the form of a combination of a TV broadcasting signal and a radio broadcasting signal.

The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160.

The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the electronic device 100 or may be externally attached to the electronic device 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 is a module for identifying or otherwise obtaining the location of an electronic device. A global positioning system (GPS) module is a representative example of the location information module 115. According to the current technology, the GPS module 115 may calculate information on distances between one point or object and at least three satellites and information on a time when distance information is measured and apply trigonometry to the obtained distance information to obtain three-dimensional position information on the point or object according to latitude, longitude and altitude at a predetermined time. A method of calculating position and time information using three satellites and correcting the calculated position and time information using another satellite may also be used. Additionally, the GPS module 115 may continuously calculate a current position in real time and calculate velocity information using the location or position information.

Referring to FIG. 1, the A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151.

The image frames processed by the camera 121 may be stored in the memory 160 or may be transmitted to an external device through the wireless communication unit 110. The electronic device 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the electronic device 100 from a user. The user input unit 130 may include a keypad, a dome switch, a touch pad (constant voltage/capacitance), a jog wheel, a jog switch and/or so on.

The sensing unit 140 may sense a current state of the electronic device 100, such as an open/close state of the electronic device 100, a position of the electronic device 100, whether a user touches the electronic device 100, a direction of the electronic device 100, and acceleration/deceleration of the electronic device 100, and the sensing unit 140 may generate a sensing signal for controlling operation of the electronic device 100. For example, if the electronic device 100 is a slide phone, the sensing unit 140 may sense whether the slide phone is opened or closed. Further, the sensing unit 140 may sense whether the power supply 190 supplies power and/or whether the interface 170 is connected to an external device. Meanwhile, the sensing unit 140 may include a posture sensor 141 and/or a proximity sensor.

The output unit 150 may generate visual, auditory and/or tactile output, and the output unit 150 may include the display 151, an audio output module 152, an alarm 153 and a haptic module 154. The display 151 may display information processed by the electronic device 100. The display 151 may display a user interface (UI) and/or a graphic user interface (GUI) related to a telephone call when the electronic device 100 is in the call mode. The display 151 may also display a captured and/or received image, a UI or a GUI when the electronic device 100 is in the video telephony mode or the photographing mode.

The display 151 may include at least one of a liquid crystal display, a thin film transistor liquid crystal display, an organic light-emitting diode display, a flexible display and/or a 3D display. Some of the above displays may be configured as a transparent or light transmissive type display through which the outside may be viewed. This may be called "transparent display".

An example of the transparent display includes a transparent LCD. A rear structure of the display 151 may also be of a light transmissive type. Accordingly, a user may see an object located behind the body (of the electronic device 100) through the transparent area of the body of the electronic device 100 is occupied by the display 151.

The electronic device 100 may also include at least two displays 151. For example, the electronic device 100 may include a plurality of displays 151 that are arranged on a single face at a predetermined distance or integrated displays. The plurality of displays 151 may also be arranged on different sides.

When the display 151 and a sensor sensing touch (hereafter, referred to as a touch sensor) form a layered structure (hereinafter, referred to as a touch screen), the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal (signals) corresponding to the touch input may be transmitted to a touch controller. The touch controller may then process the signal(s) and transmit data corresponding to the processed signal(s) to the controller 180. Accordingly, the controller 180 may detect a touched portion of the display 151.

Referring to FIG. 1, the proximity sensor may be located in an internal region of the electronic device 100, surrounded by the touch screen, and/or near the touch screen. The proximity sensor may sense an object approaching a predetermined sensing face or an object located near the proximity sensor using an electromagnetic force or infrared rays without having mechanical contact. The proximity sensor may have a lifetime longer than a contact sensor and may thus have a wide application in the electronic device 100.

The proximity sensor may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the electronic device 100. The audio output module 152 may include a receiver, a speaker, a buzzer, and/or the like.

The alarm 153 may output a signal for indicating generation of an event of the electronic device 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The electronic device 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The electronic device 100 may also operate in relation to a web storage that performs a storing function of the memory 160 on the Internet.

The interface 170 may serve as a path to external devices connected to the electronic device 100. The interface 170 may receive data from the external devices or power and transmit the data or power to internal components of the electronic device 100 or transmit data of the electronic device 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The user identification module is a chip that stores information for authenticating authority to use the electronic device 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the electronic device 100 through a port.

The interface 170 may also be a path through which power from an external cradle is provided to the electronic device 100 when the electronic device 100 is connected to the external cradle or a path through which various command signals input by the user through the cradle are transmitted to the electronic device 100. The various command signals or power input from the cradle may be used as signals for confirming whether the electronic device 100 is correctly set in the cradle.

The controller 180 may control overall operations of the electronic device 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picturedrawing input applied to the touch screen as characters or images. The power supply 190 may receive external power and internal power and provide power required for operations of the components of the electronic device 100 under control of the controller 180. The various embodiments described herein may be implemented as software, hardware, or a combination thereof in a storage medium that may be read by a computer or a similar device thereof.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180. Hereinafter, the embodiments of the present invention will be described. In the present invention, the display unit 151 is defined as a touch screen 151 for the convenience of description. As described above, the touch screen 151 may perform both a function of displaying information and a function of inputting information. However, it is apparently emphasized that the prevent invention is not limited thereto. The term "touch", to be mentioned later, is construed to mean both a contact touch and a proximity touch.

Figure 2:
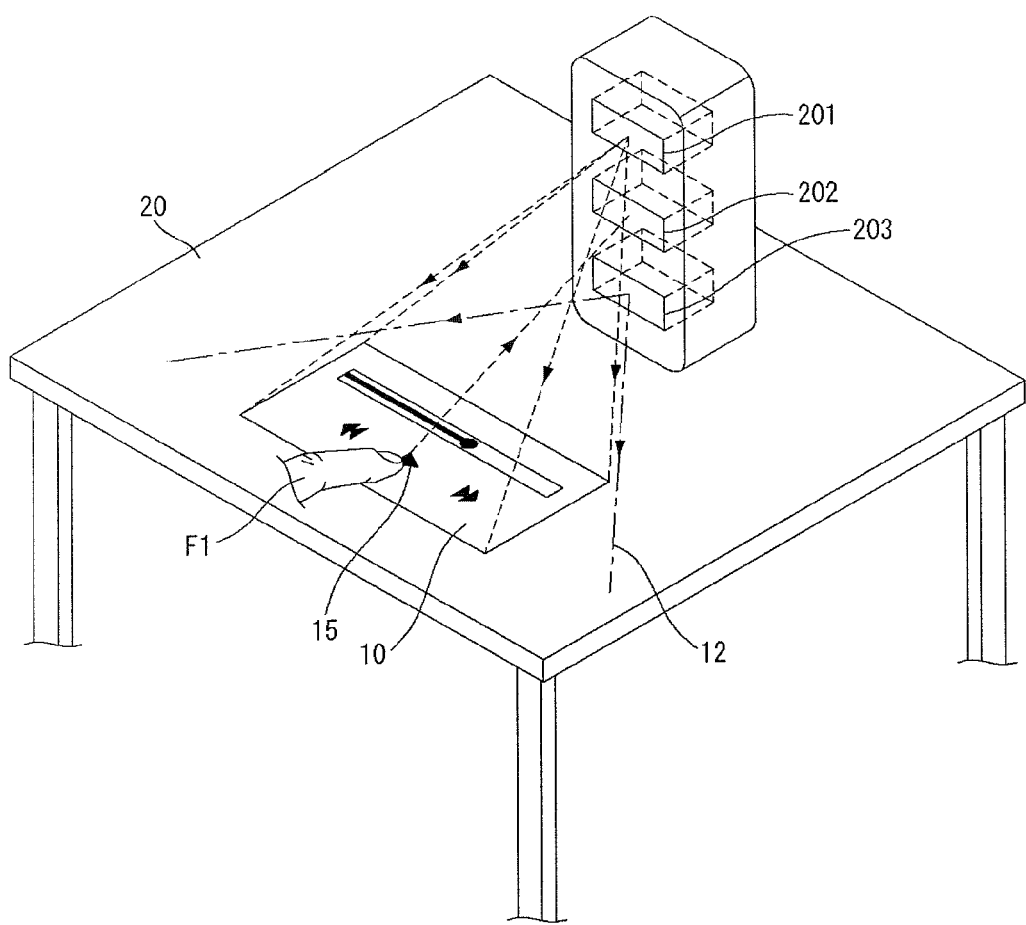
FIG. 2 is a conceptual diagram for explaining the operational principle of an electronic device according to various embodiments of the present invention.

FIG. 2 is a conceptual diagram for explaining the operational principle of an electronic device according to various embodiments of the present invention.

As shown in FIG. 2, an electronic device 100 according to an embodiment of the present invention may include a projection module 201, a sensor module 202, and an illumination module 203. That is, the projection module 201, the sensor module 202, and the illumination module 203 may be embedded in the electronic device 100.

The embodiments of the present invention may be implemented when the projection module 201, the sensor module 202, and the illumination module 203 are embedded in a device (e.g., a base or the like) where the electronic device 100 can be mounted and the electronic device 100 is mounted on it.

The projection module 201 may project a predetermined image 10 on a stationary plane 20 (e.g., table). A red laser diode included in the projection module 201 may form an image such as a keyboard image on the plane. Light projected onto the plane may be visible light.

The illumination module 203 may project light in a radial lighting pattern 12 to make the light get closer to the plane 20. When the user touches the image 10 projected on the plane 20 with a finger or the like, the light may be scattered or reflected. That is, when the user's finger or the like touches in proximity to the image 10 projected on the plane 20, the light may be scattered or reflected from the point touched by the finger or the like.

The sensor module 202 may receive the light scattered or reflected from the user's finger F1. The sensor module 202 may map the position of the user's finger F1 sensed by the received light and the position 15 on the image 10. The sensor module 202 may transmit the position information on the selected image 10 to the controller 180 of the electronic device 100. The controller 180 may control the operation of the electronic device 100 based on a control signal received from the image 10 projected onto the plane.

Figure 3:
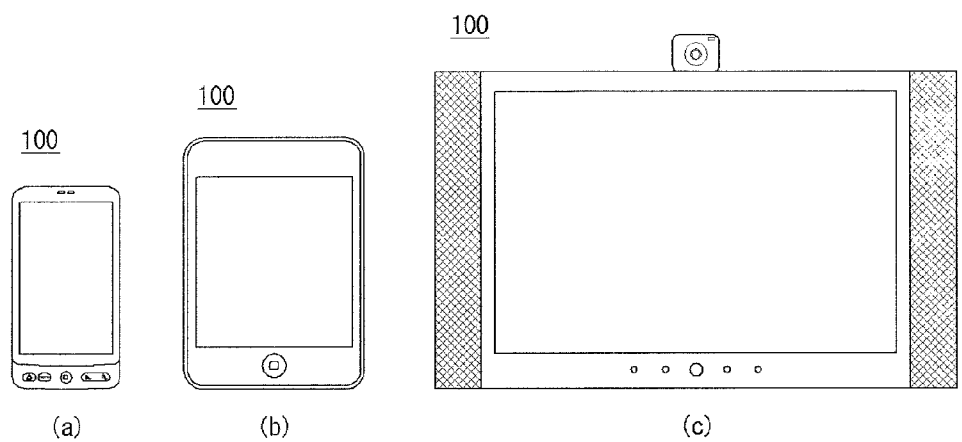
FIG. 3 is a view of an electronic device according to various embodiments of the present invention.

FIG. 3 is a view of an electronic device according to various embodiments of the present invention.

The electronic device 100 according to the embodiments of the present invention may include a mobile phone, a smart phone ((a) of FIG. 3), a tablet computer ((b) of a tablet computer), a smart TV ((c) of FIG. 3), etc. Further, it may include a laptop computer, a digital broadcasting terminal, a PDA (personal digital assistant), a PMP (portable multimedia player), a navigation system, a digital TV, a desktop computer, etc.

Figure 4:
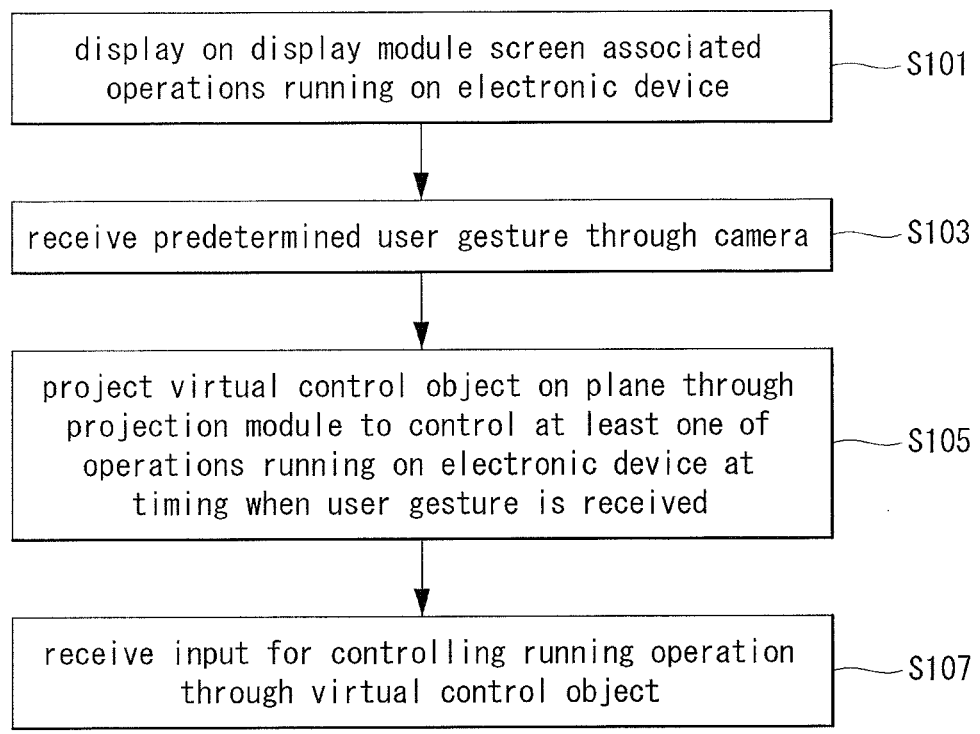
FIG. 4 is a flowchart of a control method of an electronic device according to an embodiment of the present invention.

FIG. 4 is a flowchart of a control method of an electronic device according to an embodiment of the present invention.

The controller 180 may display on the display module 151 a screen associated with operations running on the electronic device 100 (S101).

The controller 180 may display the execution screen of a running application on the display module 151. For example, if a video play application is running, the controller 180 may display the video playback screen on the display module 151.

The controller 180 may display a screen associated with an event that has occurred. The event may include call reception, message reception, and alarm. For example, the controller 180 may display on the display module 151 a screen indicating that a call is coming in.

The controller 180 may receive a predetermined user gesture through the camera 121 (S103).

When a predetermined user gesture is received, it may be matched to perform a particular function and stored in the memory 160. The predetermined user gesture may be preset in the electronic device 10, or set or reset by the user.

The controller 180 may project a virtual control object on the plane through a projection module to control at least one of the operations running on the electronic device 100 at the timing when a user gesture is received (S105).

For example, when a video play application is running on the electronic device 100, the controller 180 may project a virtual control object on the plane to control video playback upon receiving a predetermined user gesture. The virtual control object may include an icon, a scrollbar, a touch input reception area, etc in order to control video playback.

The controller 180 may project a virtual control project on the plane within a predetermined distance from the electronic device 100 through the projection module. The predetermined distance refers to the range in which the electronic device 100 can receive a control signal from a virtual control object.

The controller 180 may receive an input for controlling the running operation through the virtual control object (S107).

That is, a predetermined execution screen displayed on the display module 100 can be controlled by touching a virtual control object projected on the plane, without the user's manipulating the electronic device 100.

The electronic device 100 according to an embodiment of the present invention is able to project on the plane a virtual control object which is associated with a currently running operation, that is, suitable for each situation, based on a user gesture.

Figure 6:
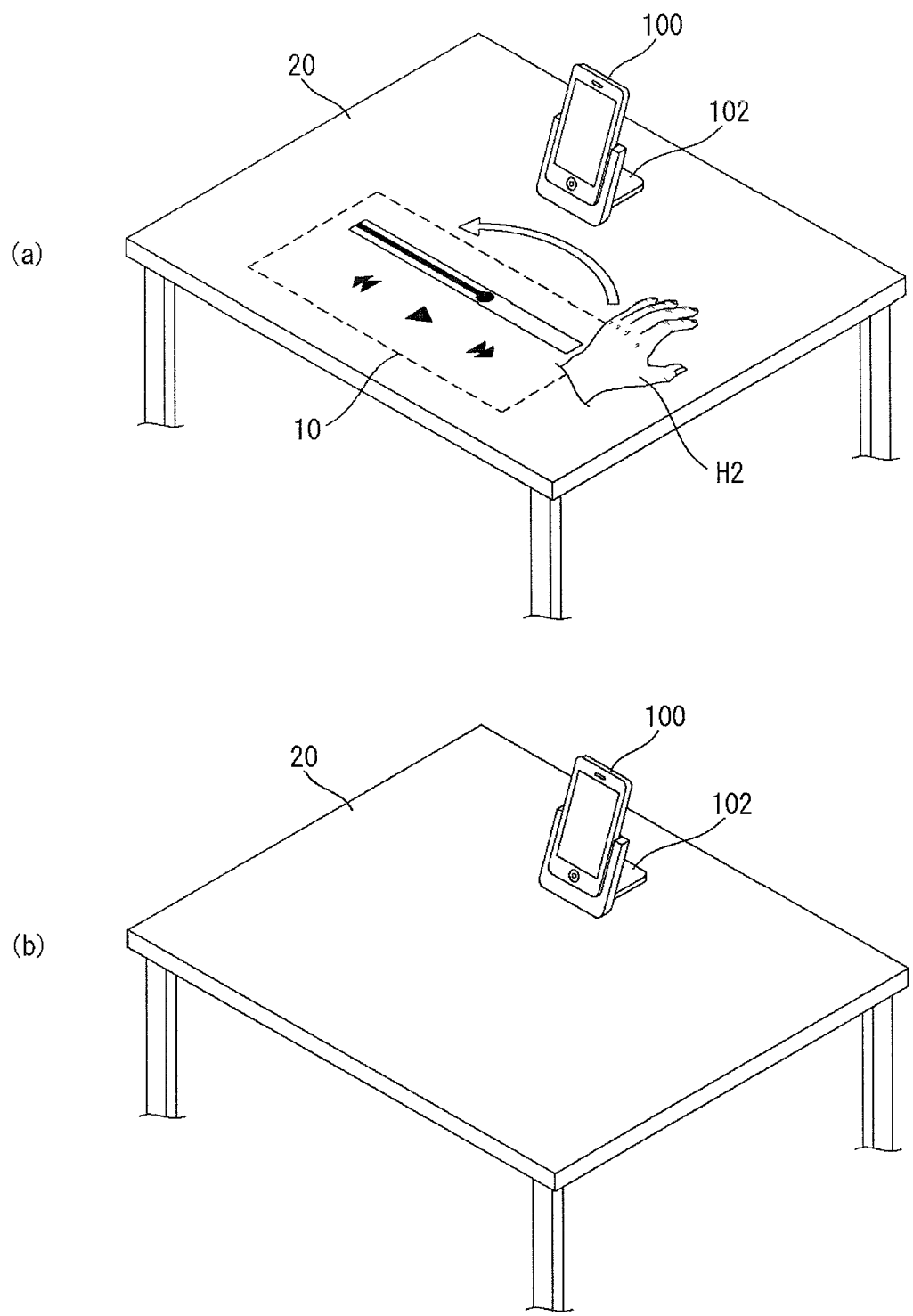

FIGS. 5 to 7 are views for explaining an embodiment of the present invention.

FIG. 5 illustrates an example where a virtual control object is projected on the plane when a user gesture is received.

The electronic device 100 may include a camera 121 for capturing a user gesture. The electronic device 100 may receive a predetermined user gesture from the plane 20 within a predetermined distance from the electronic device 100 through the camera 121.

The plane within the predetermined distance may refer to the plane that is within the range in which a user gesture can be captured through the camera 121. The predetermined user gesture may be a gesture input preset in the electronic device 100. Also, the predetermined user gesture may be set or reset by a user input.

As shown in (a) of FIG. 5, the electronic device 100 may receive a gesture of moving the hand H1 to the right on the plane 20 within a predetermined distance from the electronic device 100.

As shown in (b) of FIG. 5, upon receiving a predetermined user gesture, the electronic device 100 may project a virtual control object 10 on the plane 20 within a predetermined distance from the electronic device 100. The virtual control object 10 may be an object for controlling at least one of the operations running on the electronic device at the timing when a user gesture object is received.

FIG. 6 illustrates an example where a virtual control object disappears when a user gesture is received.

As shown in (a) of FIG. 6, when a virtual control object 10 is projected on the plane 20, the controller 180 may receive a gesture of moving the user's hand H2 to the left on the virtual control object 10.

As shown in (b) of FIG. 6, upon receiving the gesture of moving the user's hand H2 to the left, the controller 180 may not project the virtual control object on the plane 20. That is, the virtual control object 10 projected on the plane 20 may disappear.

FIG. 7 illustrates an example where a virtual control object is projected in a region of the plane that corresponds to a gesture reception range.

The controller 180 may receive a predetermined user gesture from the plane within a predetermined distance from the electronic device 100. The controller 180 may project a virtual control object in a region of the plane that corresponds to the gesture reception range.

As shown in (a) and (b) of FIG. 7, the virtual control object 10 may be projected in a region A1 corresponding to the user gesture reception range, that is, the trajectory of the user's hand H3.

(c) and (d) of FIG. 7 illustrate an example where a user gesture is received in a narrower region than in (a) and (b) of FIG. 7. As shown therein, the controller 180 may project the virtual control object 10 in a region A2 corresponding to the user gesture reception range, that is, the trajectory of the user's hand H4.

The user may move the hand to the left so as to correspond to the range in which they want to display the virtual control object 10 on the plane. That is, if the moving range of the hand is wide, the virtual control object 10 may be displayed in a wide region, or if the moving range of the hand is narrow, the virtual control object 10 may be displayed in a narrow region.

While FIGS. 5 to 7 have been described with respect to an example where a virtual object is displayed based on a gesture of moving the hand to the left and the virtual object disappears based on a gesture of moving the hand to the left, the embodiment of the present invention is not limited to this example. For example, the embodiment of the present invention is applicable when moving the hand up and down. That is, the embodiment of the present invention is applicable to a user gesture that can be acquired through the camera 121 of the electronic device 100.

FIGS. 8 to 11 illustrate an example where a virtual control object associated with a running application is displayed according to an embodiment of the present invention.

(a) of FIG. 8 illustrates an example where a screen associated with a video play application running on the electronic device 100 is displayed on the display module 151. (b) and (c) of FIG. 8 illustrate an example of the virtual control object 10 projected on the plane.

When a predetermined user gesture is received, the controller 180 may project a virtual control object on the plane through the projection module to control at least one of the operations running on the electronic device 100 at the timing when the user gesture is received.

That is, if the video play application is running at the time when a predetermined user gesture is received, the controller 180 may project a virtual control object 10 on the plane through the projection module to control video playback.

As shown in (b) and (c) of FIG. 8, the virtual control object 10 for controlling the video play application may include a scrollbar s1 for indicating the playback position in the entire file, an icon I3 for volume control, and icons for stop, pause, screen, reduce screen, capture screen, caption settings, zoom out, zoom in, etc.

Upon receiving an input F3 for selecting the icon I3 for volume control included in the virtual control object 10, the controller 180 may further project a scrollbar S3 for volume control near the icon I3.

The controller 180 may control the operation of a running application, based on an input signal received through the virtual control object 10.

(a) of FIG. 9 illustrates an example where a screen associated with an e-book running on the electronic device 100 is displayed. (b) of FIG. 9 illustrates an example of the virtual control object 10 projected on the plane. (c) of FIG. 9 illustrates an example of change of execution screen of the display module 10.

Upon receiving a predetermined user gesture when the e-book is displayed on the display module 151, the controller 180 may project a virtual control object associated with the e-book on the plane. For example, as shown in (b) of FIG. 9, the controller 180 may project on the plane a virtual control object 10, including a scrollbar S5 for indicating the current position in the page displayed on the display module 151, icons I5 and I6 for turning the pages, an icon for calling lists, an icon for search, an icon for page scrapping, and an icon for a predetermined setting.

Upon receiving an input F4 for selecting the icon I6 for turning to the next page, the controller 180 may display the next page to the page currently displayed on the display module 151 ((c) of FIG. 9).

Figure 10:
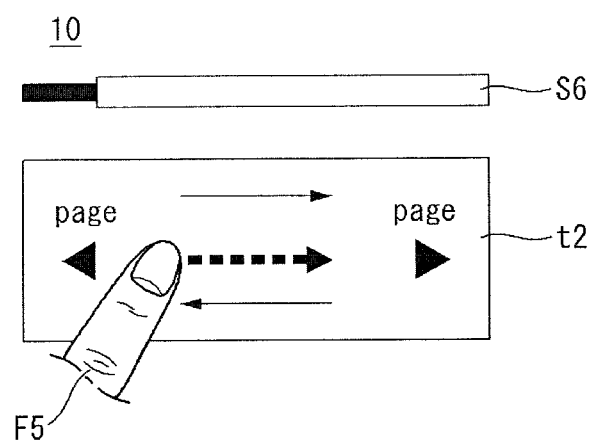

FIG. 10 illustrates an example of a virtual control object 10 projected on the plane. That is, FIG. 10 illustrates an example where, upon receiving a predetermined user gesture when an e-book is displayed on the display module 151, a virtual control object associated with the e-book is projected on the plane.

As shown in FIG. 10, the virtual control object 10 may include a scrollbar S6 for indicating the current position in the page displayed on the display module 151, a touch area t2 for turning the pages, etc.

For example, upon receiving an input F5 for dragging the touch area t2 for turning the pages to the right, the controller 180 may display the next page on the display module 151. Also, upon receiving an input for dragging the touch area t2 for turning the pages to the left, the controller 180 may display the previous page on the display module 151.

FIG. 11 illustrates an example where, while an application associated with playing a musical instrument is running, a virtual control object associated with the running application is projected.

As shown in (a) of FIG. 11, when a musical score is displayed on the display module 151, the controller 180 may project on the plane a virtual control object 10 including the image of a piano keyboard, based on a predetermined user gesture.

The electronic device 100 may output a predetermined sound corresponding to a piano key for which an input signal is received, based on a finger touch input on the piano keyboard projected on the plane.

That is, by pressing a virtual piano keyboard projected on the plane while reading the musical score displayed on the display module 151, the user feels as if playing the piano themselves.

Figure 12:
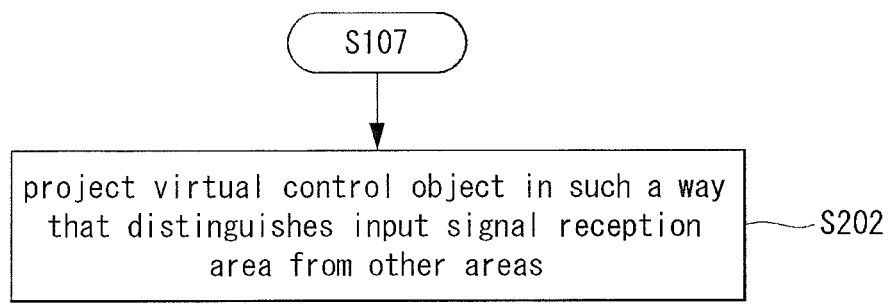
Figure 14:
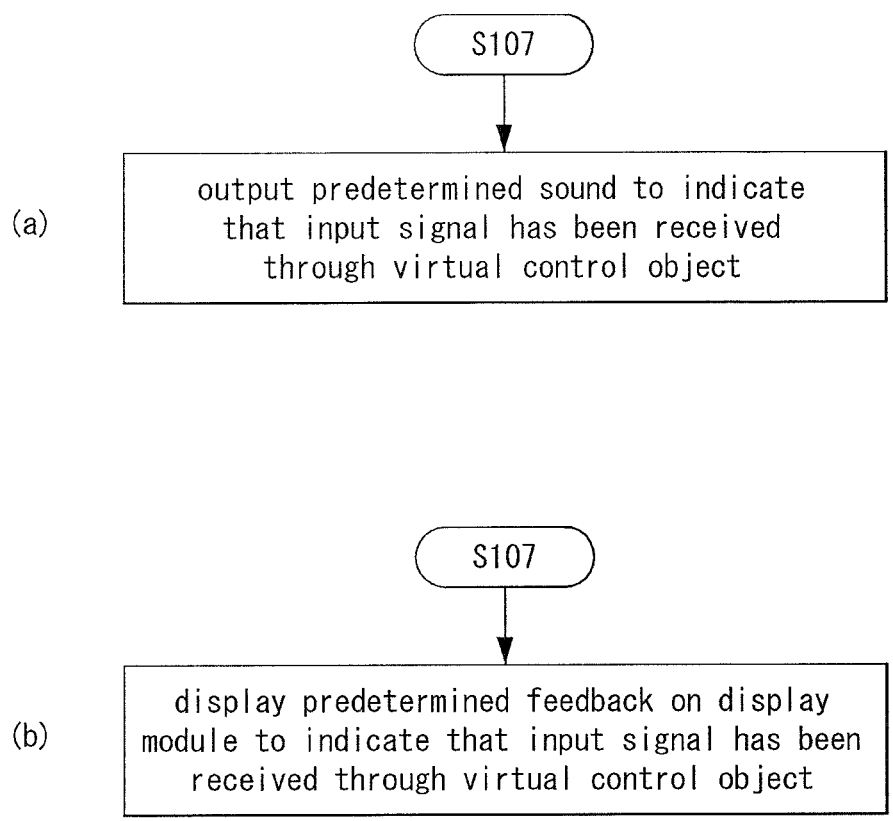
Figure 15:
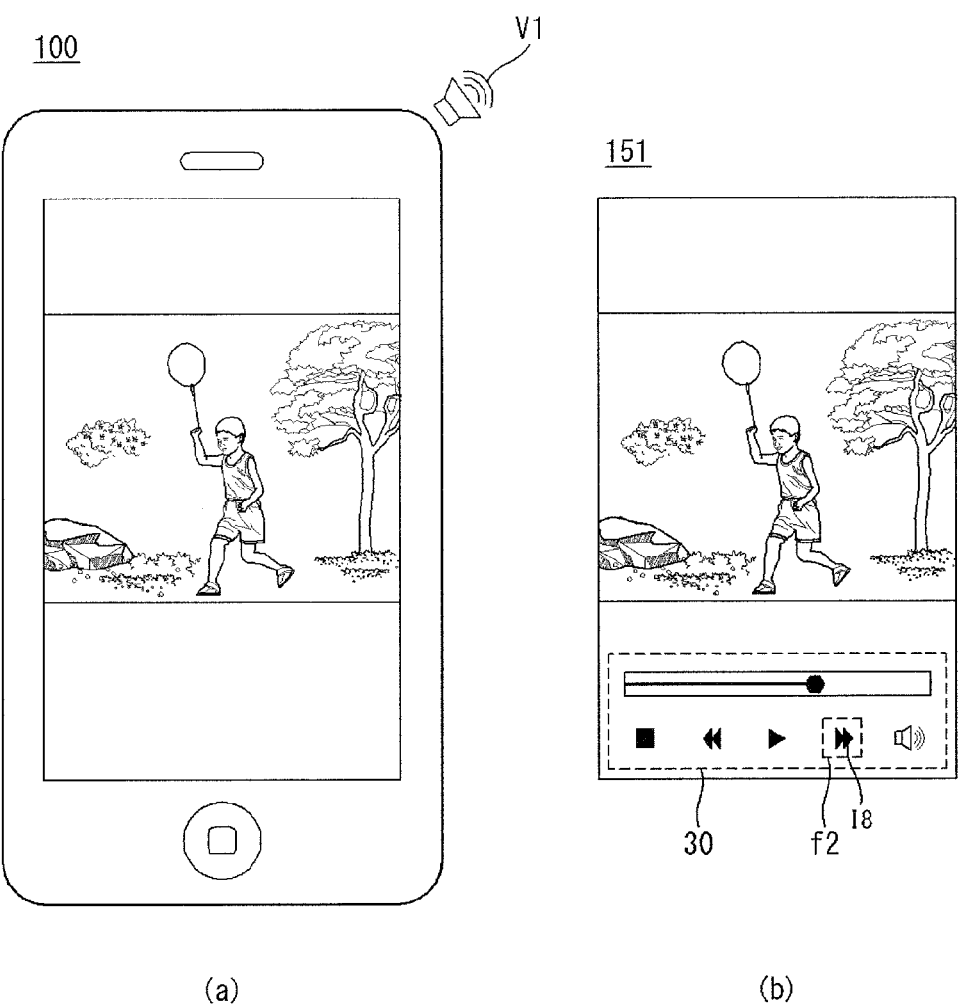

FIGS. 12 to 15 are sequential charts and views for explaining an example of feedback for an input signal according to an embodiment of the present invention. FIGS. 12 and 14 are sequential charts for explaining an example of feedback for an input signal. FIGS. 13 and 15 are views for explaining an example of feedback for an input signal.

As shown in FIG. 12, upon receiving an input signal through a virtual control object (S107 of FIG. 4), the controller 180 may project the virtual control object in such a way that distinguishes the input signal reception area from other areas (S202).

As shown in FIG. 13, the controller may display a video playback screen on the display module 151, and upon receiving a predetermined user gesture, project a virtual control object 10 on the plane through the projection module to control video playback.

Upon receiving an input signal F6 on an icon I7 included in the virtual control object 10, the controller 180 may project a predetermined feedback indicator for indicating that an input signal on the icon I7 has been received. The predetermined feedback indicator may be a dotted line f1 projected near the selected icon I7. Also, the predetermined feedback indicator may be used for identification to distinguish the reception area of an input signal on the selected icon, from other areas by shading, enlarging, or reducing the selected icon.

As shown in (a) of FIG. 14 and (a) of FIG. 15, upon receiving an input signal through a virtual control object (S107 of FIG. 4), the controller 180 may output a predetermined sound v1 to indicate that an input signal has been received.

As shown in (b) of FIG. 14, upon receiving an input signal through the virtual control object (S107 of FIG. 4), the controller 180 display predetermined feedback on the display module 151 to indicate that an input signal has been received. As shown in (b) of FIG. 15, the controller 180 may display on the display module 151 an object 30 including the same image as the virtual control object 10 projected on the plane.

Upon receiving an input signal on the icon I7 through the virtual control object 10 projected on the plane ((b) of FIG. 13), the controller 180 may display a predetermined indicator f2 near an icon I8 displayed on the display module 151 to indicate that an input signal has been received. The predetermined indicator f2 may be a dotted line near the selected icon. Also, the predetermined feedback indicator may involve shading, enlarging, and reducing the selected icon.

FIGS. 16 to 20 illustrate an example where a virtual control object associated with event occurrence according to an embodiment of the present invention.

FIG. 16 illustrates an example where, when there is an incoming call during video playback on the electronic device 100, a virtual control object for controlling the incoming call is projected on the plane based on a predetermined user gesture.

As shown in (a) of FIG. 16, when there is an incoming call during video playback, the controller 180 may display on the display module 151 a window e1 for indicating the incoming call.

Upon receiving a predetermined user gesture while the call is coming in, the controller 180 may project a virtual control object 10 on the plane to control the incoming call. The virtual control object 10 may include information containing the phone number, name, etc of the caller, an icon I9 for call connection, an icon for displaying the keypad, an icon for terminating the call connection, etc.

Upon receiving an input F8 for selecting the icon I9 for call connection included in the virtual control object 10, the controller 180 may accept the call. That is, the controller 180 may receive an input signal through the virtual control object 10 and perform an operation corresponding to the received input signal.

As shown in FIG. 16(c), the virtual control object 10 may include a touch area t3 associated with call connection. The controller 180 may accept the call based on an input F9 for dragging the touch area t3 to the left. Also, the controller 180 may end the call connection based on an input for dragging the touch area t3 to the left.

Figure 18:
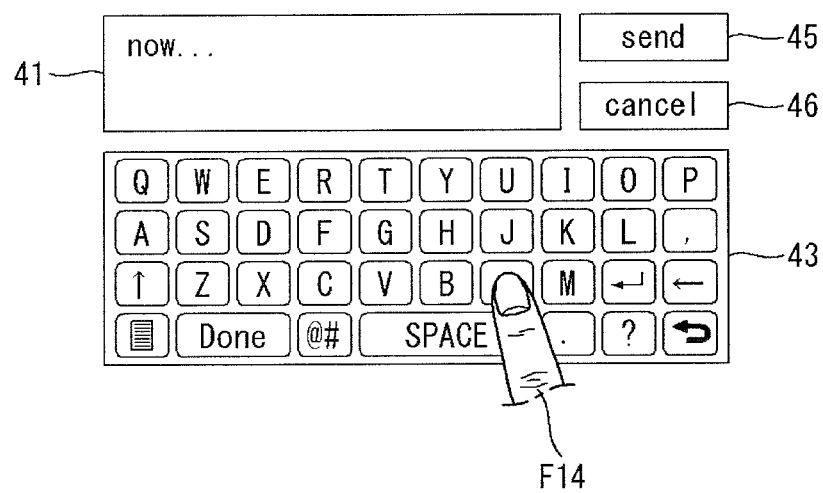

FIGS. 17 and 18 illustrate an example of a virtual control object 10 for controlling an incoming call.

As shown in (a) of FIG. 17 and (a) of FIG. 18, upon receiving a predetermined user gesture while a call is coming in, the controller 180 may project a virtual control object 10 on the plane to control the incoming call. The virtual control object 10 may include an icon I11 for sending a preset reply message and an icon I12 for writing messages.

As shown in (a) and (b) of FIG. 17, upon receiving an input F11 for selecting the icon I11, the controller 180 may project a list of preset messages on the plane. The controller 180 may receive an input F12 for selecting any one m1 in the message list.

As shown in (a) and (b) of FIG. 18, upon receiving an input F13 for selecting the icon I12, the controller 180 may project on the plane a virtual control object 10 containing a keyboard 43 for writing a message, a window 41 for displaying a written message, and icons 45 and 46 for send and cancel. The controller 180 may receive an input signal F14 on the keyboard 43 to write a message.

Figure 20:
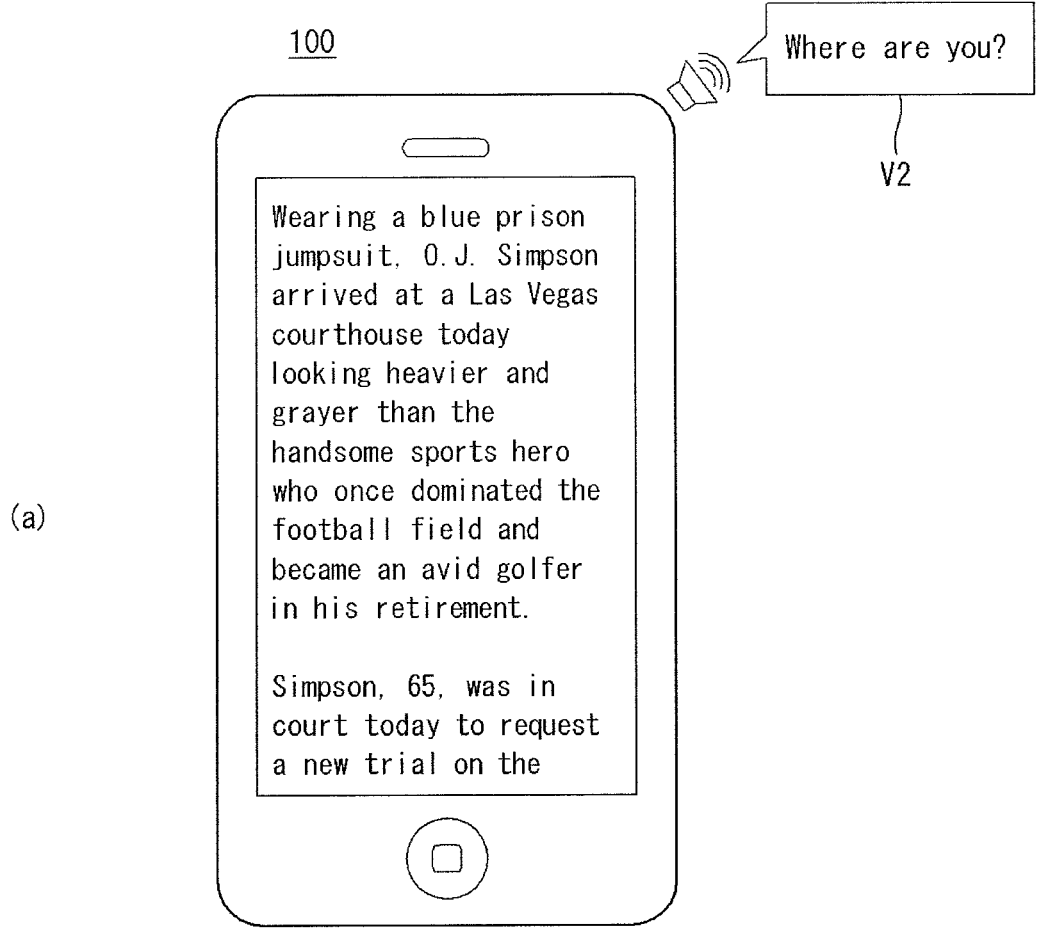

FIGS. 19 and 20 illustrate an example of message reception when an e-book is displayed on the display module 151 in the electronic device 100.

As shown in (a) of FIG. 19, the controller 180 may display on the display module 151 a window e2 for indicating an incoming message. The window e2 for indicating a received message may contain caller information.

As shown in (b) of FIG. 19, if there is a new unread message, the controller 180 may project on the plane a virtual control object 10 for the received message based on a predetermined user gesture.

The virtual control object 10 may contain an icon I13 for indicating the received message and an icon for sending a reply message. The controller 180 may receive an input F15 for selecting the icon I13 for indicating the received message.

As shown in (a) of FIG. 20, the controller 180 may output (v2) the received message (e.g., "where are you?") through the sound output module 152. Also, as shown in (b) of FIG. 20, the controller 180 may project on the plane a virtual control object 10 containing the received message 48.

Figure 21:
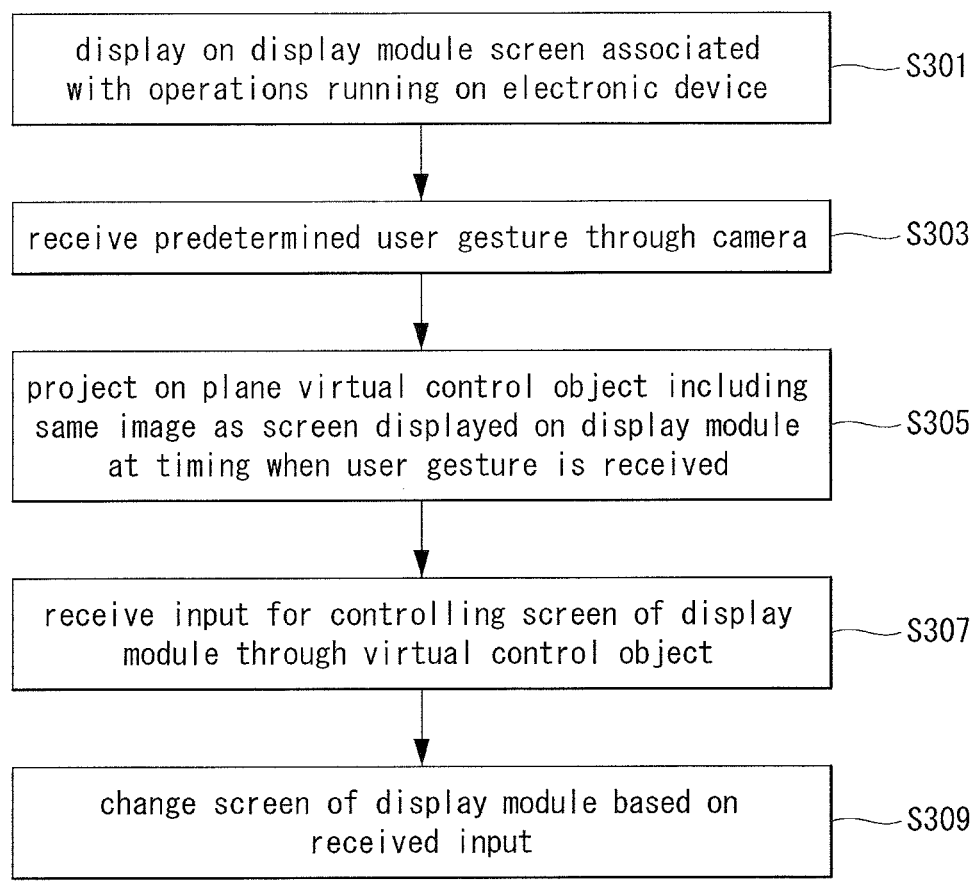
FIG. 21 is a flowchart of a control method of an electronic device according to another embodiment of the present invention.

FIG. 21 is a flowchart of a control method of an electronic device according to another embodiment of the present invention.

The controller 180 may display on the display module 151 a screen associated with operations running on the electronic device 100 (S301). The controller 180 may receive a predetermined user gesture through a camera (S303). The steps S301 and S303 will be described with reference to the detailed description of FIG. 4.

The controller 180 may project on the plane a virtual control object including the same image as the screen displayed on the display module 151 at the timing when the user gesture is received (S305). That is, the screen displayed on the display module 151 and the virtual control object 10 projected on the plane may include the same image.

The controller 180 may receive an input for controlling the screen of the display module 151 through the virtual control object (S307). That is, the user can enter a predetermined signal, not through the display module 151, but through the virtual control object 10.

The controller 180 may change the screen of the display module 151 based on the received input (S309). That is, the controller 180 may change the screen of the display module 151 based on an input signal selected on the virtual control object 10.

The image in the virtual control object 10 may not be changed even if the screen of the display module 151 is changed. That is, the virtual control object 10 may serve to control the operation of the electronic device 100 displayed on the display module 151.

FIG. 22 is a view for explaining another embodiment of the present invention.

(a) of FIG. 22 illustrates an example where a webpage is displayed on the display module 151. The webpage may contain hyperlinks 11 and 12 for leading to other webpages.

As shown in (b) of shown in FIG. 22, a virtual control object 10 may include the same image as the webpage displayed on the display module 151.

As shown in (b) and (c) of FIG. 22, upon receiving an input signal for selecting a hyperlink 151 contained in the virtual control object 10, the controller 180 may change the display screen of the display module 151 to the webpage corresponding to the selected hyperlink 151. The virtual control object 10 projected on the plane may not be changed. That is, the virtual control object 10 may serve to control the display screen of the display module 151.

The above-described method of controlling the electronic device may be written as computer programs and may be implemented in digital microprocessors that execute the programs using a computer readable recording medium. The method of controlling the electronic device may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

An electronic device may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling an electronic device that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
a display module;
a camera configured to capture a user gesture;
a projection module configured to project a virtual control object on a plane within a predetermined distance from the electronic device; and
a controller configured to:
display on the display module a screen of a video playback and a window for indicating an incoming call when the incoming call is received during the video playback,
upon receiving a first user gesture through the camera, activate the projection module and identify a moving range of the first user gesture as a projection region on the plane through the camera,
project first virtual control objects for controlling the incoming call in the projection region through the activated projection module at the time when the first user gesture is received, wherein the first virtual control objects include a first icon for a call connection, a second icon for sending a preset reply message, a third icon for writing messages and a fourth icon for terminating the call connection, upon receiving an input for selecting one of the first virtual control objects, change the projected first virtual control objects into second virtual control objects related to a next operation of the selected one and display the changed second virtual objects, wherein a display size of the second virtual objects is different from a display size of the first virtual objects, and upon receiving a second user gesture through the camera, deactivate the projection module and terminate projecting the second virtual control objects in the projection region.

2. The electronic device of claim 1, wherein an operation running on the electronic device is a predetermined application that is running on the electronic device.

3. The electronic device of claim 1, wherein an operation running on the electronic device is an event that has occurred on the electronic device.

4. The electronic device of claim 3, wherein the event comprises at least either call reception, message reception, or alarm.

5. The electronic device of claim 1, wherein the controller receives the first user gesture from the plane within the predetermined distance from the electronic device.

6. The electronic device of claim 1, wherein the controller is further configured to additionally project another virtual control object different from the virtual control object when the one of the first virtual control objects is selected.

7. The electronic device of claim 1, wherein the first virtual control objects comprise at least either an icon, a scrollbar, a touch input reception area, or a keypad to control the operation running on the electronic device.

8. The electronic device of claim 1, wherein the controller receives an input for controlling the running operation by a touch input on the selected one of the virtual control objects.

9. The electronic device of claim 8, wherein, upon receiving a touch input for selecting an area of the first virtual control objects, the controller projects the selected area on the plane to distinguish the selected area from other areas.

10. The electronic device of claim 1, wherein the controller further displays on the display module an object including the same image as the first virtual control objects projected on the plane.

11. The electronic device of claim 10, wherein, upon receiving a touch input for selecting an area of the first virtual control objects, the controller displays an indicator on the display module to indicate that the touch input has been received.

12. The electronic device of claim 1, wherein the first virtual control objects comprise the same image as the screen displayed on the display module.

13. A control method of an electronic device comprising:
displaying on a display module a screen of a video playback and a window for indicating an incoming call when the incoming call is received during the video playback;

receiving a first user gesture through a camera;

activating a projection module and identifying a moving range of the first user gesture as a projection region on a plane through the camera within a predetermined distance from the electronic device;

projecting first virtual control objects for controlling the incoming call in the projection region through the activated projection module at the time when the first user gesture is received, wherein the first virtual control objects include a first icon for a call connection, a second icon for sending a preset reply message, a third icon for writing messages and a fourth icon for terminating the call connection;

upon receiving an input for selecting one of the first virtual control objects, changing the projected first virtual control objects into second virtual control objects related to a next operation of the selected one and displaying the changed second virtual objects, wherein a display size of the second virtual objects is different from a display size of the first virtual objects;

receiving a second user gesture through the camera; and deactivating the projection module and terminating projecting the second virtual control objects in the projection region.

14. The control method of claim 13, wherein, in the receiving of a user gesture, the first user gesture is received from the plane within the predetermined distance from the electronic device.

15. The control method of claim 13, further comprising receiving an input for controlling the running operation by a touch input on one of the first virtual control objects.

16. The control method of claim 15, further comprising, upon receiving a touch input for selecting an area of the first virtual control objects, projecting the selected area on the plane to distinguish the selected area from other areas.

17. The control method of claim 13, further comprising displaying on the display module an object including the same image as the first virtual control objects projected on the plane.

18. The control method of claim 17, further comprising, upon receiving a touch input for selecting an area of the first virtual control objects, displaying an indicator on the display module to indicate that the touch input has been received.

19. The electronic device of claim 1, wherein:
the operations running on the electronic device include a first application and a second application,
the screen is associated with an execution result of the first application and an execution result of the second application overlapped with each other,
the controller is configured to project the first virtual control objects related to the execution result of the second application in the projection region in a state of displaying the execution result of the first application on the display module.

\* \* \* \* \*